May 13, 1941.  A. W. PLENSLER ET AL  2,241,715

ELECTRICAL CONTROL APPARATUS

Filed Aug. 30, 1938  7 Sheets-Sheet 1

Fig. 1.

Inventors
Alexander W. Plensler
and Richard C. Marholz
By: Foorman L. Mueller
Atty.

Inventors:
Alexander W. Plensler
and Richard C. Marholz
By Foorman L. Mueller
Atty.

May 13, 1941.  A. W. PLENSLER ET AL  2,241,715
ELECTRICAL CONTROL APPARATUS
Filed Aug. 30, 1938    7 Sheets-Sheet 7

Inventors:
Alexander W. Plensler
and Richard C. Marholz.
By:- Foorman L. Mueller
Atty.

Patented May 13, 1941

2,241,715

UNITED STATES PATENT OFFICE 2,241,715

ELECTRICAL CONTROL APPARATUS

Alexander W. Plensler and Richard C. Marholz, Chicago, Ill., assignors to Belmont Radio Corporation, Chicago, Ill., a corporation of Illinois Application August 30, 1938, Serial No. 227,525

15 Claims. (Cl. 192—142)

Our invention relates in general to so-called automatic tuning for radio receivers, and more particularly to an electrically operated tuning apparatus for a radio receiver which can be successfully operated from a remote or an adjacent position.

According to the present invention, the cam and lever structure of the mechanically operated tuning apparatus of copending Plensler application, Serial No. 170,070, is utilized in an electrically operated tuning apparatus which may be controlled from a remote or an adjacent position, as contrasted to the mechanical tuning apparatus of the above identified application which is operated directly at the apparatus and entirely by manual means.

The embodiment of the present invention is provided in a sturdy, simplified, and inexpensive apparatus which is operated by an electrical circuit which itself is extremely simple, and requires a very minimum number of contacts so that the assembly and original adjustment of the device is accomplished in a very expeditious and efficient manner, and subsequent servicing of the unit is substantially eliminated.

Other features and advantages of the invention will be apparent from the following description and the drawings, in which.

Figure 1:
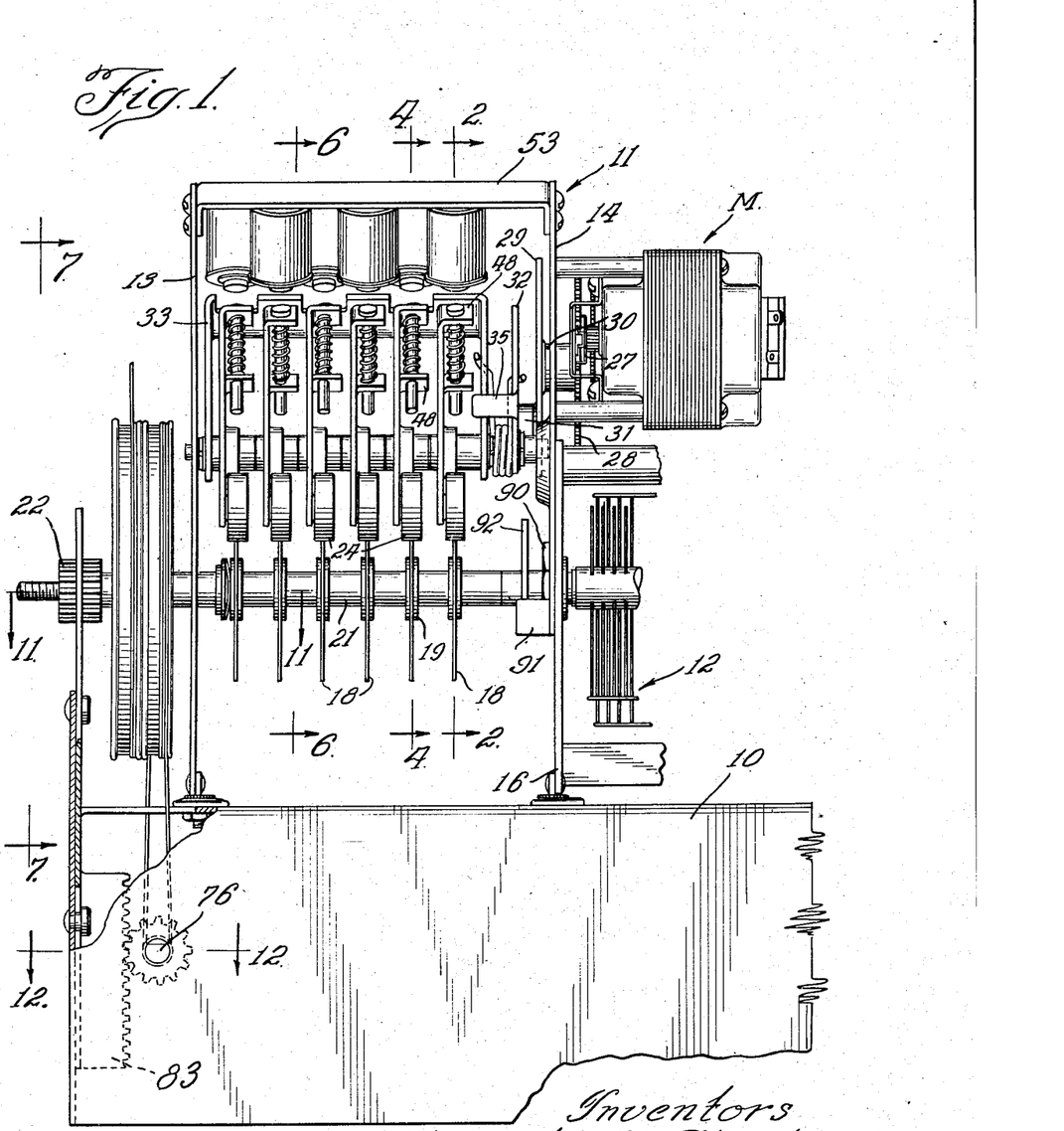
Fig. 1 is a front elevation of the tuning control apparatus according to one embodiment of our invention.
Figures 2, 3:
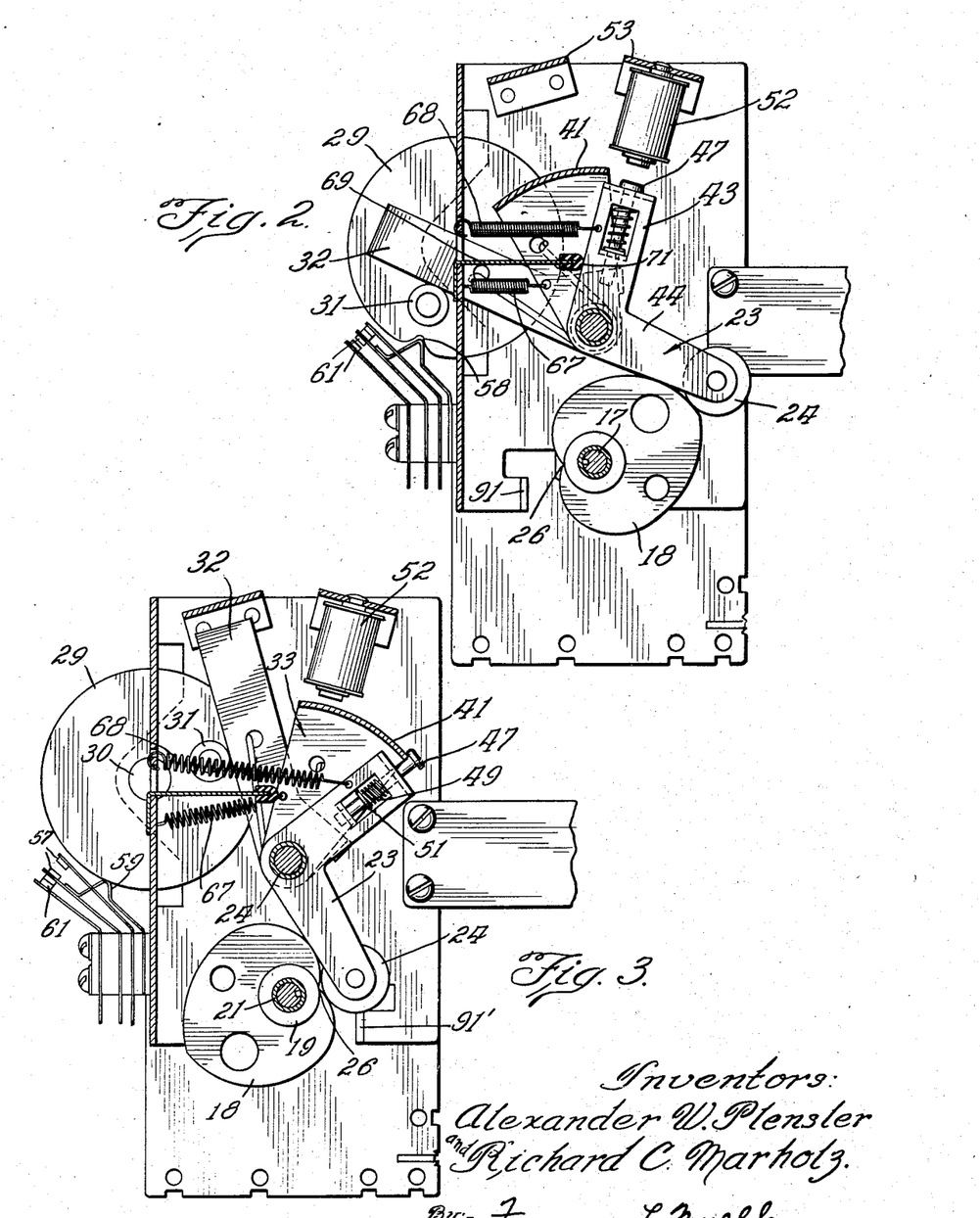
Fig. 2 is a cross-sectional view taken along the line 2—2 of Fig. 1.
Fig. 3 is a view of the structure illustrated in Fig. 2, with the control elements in the final predetermined control position, and hence in an advanced position with respect to the starting position of such elements in Fig. 2.
Figure 5:
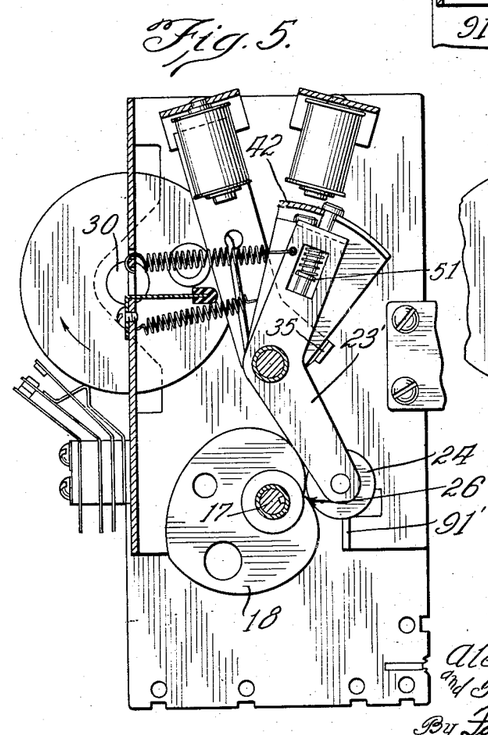
Fig. 5 is a view of the structure of Fig. 4 showing such structure in the final adjusted control position.

Referring now to the drawings, Fig. 1 illustrates tuning apparatus mounted on a chassis 10 for a radio receiver and including a preassembled tuning unit 11 connected with a tuning condenser 12 for angular adjustment of the latter. The mechanism itself is supported on a frame including end plates 13 and 14, with the latter secured to end plate 16 of the condenser frame which in turn is supported from the chassis. A shaft 17 (Fig. 2), is connected to, or is integral with, the shaft for the tuning condenser 12. The shaft 17 is appropriately journalled in the tuner frame and supports thereon a plurality of heart-shaped control members 18 angularly adjustable with respect to the shaft 17, and frictionally retained by means of friction washers 19 non-rotatable but axially movable with reference to the shaft, and axially slidable sleeves 21 intermediate each pair of friction washers. The frictional pressure intermediate the washers 19 and control members 18 is varied in accordance with the axial position of an internally threaded friction gear 22 as will be hereinafter more specifically described. The control members 18 are selectively moved to a predetermined angular position to move the shaft 17 therewith by means of corresponding pivotally mounted selector levers 23 and 23' individually pivoted on a rigid shaft 24 carried in the unit frame. Upon movement of a selector lever, the corresponding control member 18 is moved by the engagement of the roller 24 on the lever against the edge of the control member, and the transmission of the movement of the lever therethrough. The control member is rotated until the roller 24 is seated in the depression 26 in the control member as shown in Figs. 3 and 5, for instance. This general structure and operation is more fully disclosed in the copending Plensler application identified above.

Figures 8, 9, 10, 11, 12:
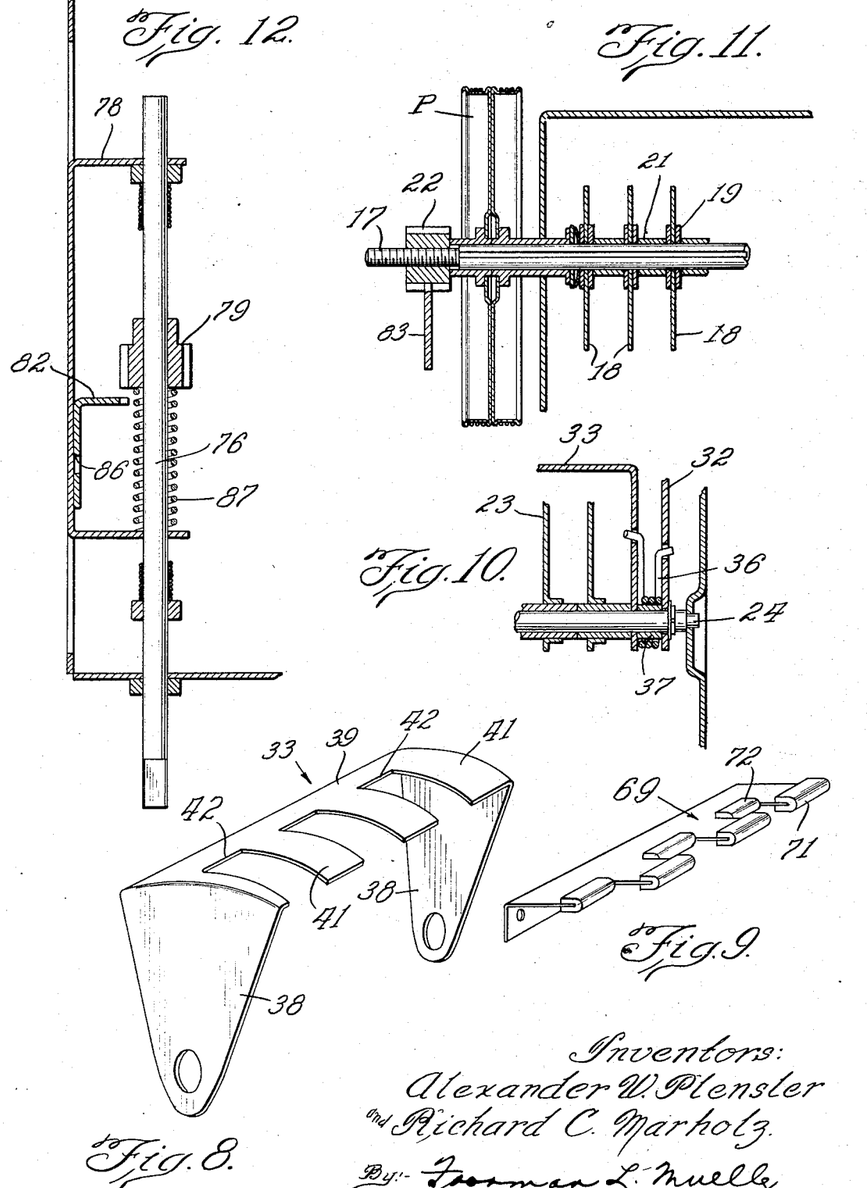
Fig. 8 is a perspective view in detail of the pivotal latching member from the structure of Fig. 1.
Fig. 9 is a perspective view of the stop member for the selector levers of the structure of Fig. 1.
Fig. 10 is a fragmentary detail principally in section of the torsion-spring connection between the driving arms and latch members illustrated in both of the embodiments of our invention shown and described in this application.
Fig. 11 is a sectional view looking in the direction of the arrows along the line 11—11 of Fig. 1.
Fig. 12 is a horizontal view partly in section along the line 12—12 of Fig. 1.

Preselective pivotal movement is imparted to the selector levers 23 and 23' by means of a unidirectional electric motor M connected by an appropriate train of gears 28 with a driven member 29 which acts to control the operation of the main switch for the tuner circuit, and also to indirectly drive the selector levers. The member 29 is not connected into an electric circuit in any way, but for convenience in differentiating it from the other elements it will be referred to as a commutator disc. The commutator disc 29 is supported for complete rotary movement on a stub shaft 30 carried on the tuner frame, and such disc 29 is connected through a roller 31 thereon with a driving arm 32 pivotally supported on the shaft 24, as may be seen more clearly in Fig. 10. The driving arm 32 in turn is connected with a latch member 33 likewise pivotally supported on the shaft 24. In order to permit relative movement as between the driving arm 32 and latch member 33, during a portion of a complete operating cycle, as will be hereinafter described, such arm and member are connected only by a relatively stiff torsion-spring 36 hooked into the driving arm and latch member as can be seen in Fig. 10, and supported on the bushing 37 carrying the driving arm 32. The entire driving force of the arm 32 is transmitted through such spring, hence it is understood that the spring must be stiff enough to accommodate this force and maintain the two members substantially together through the operating stroke. A stop 35 on the arm 32 prevents the latch member from dropping away from the driving arm in a clockwise direction, as viewed in Figs. 2, 3, 4, 5, 6, and 14, but does not prevent the driving arm from moving ahead of the latch member in a clockwise direction as noted particularly in Figs. 5 and 6, and as will be more fully described. Normally, the force of the spring under tension secured at its opposite ends as described, maintains the leg of the latch member 33 against the face of the stop 35.

Figure 4:
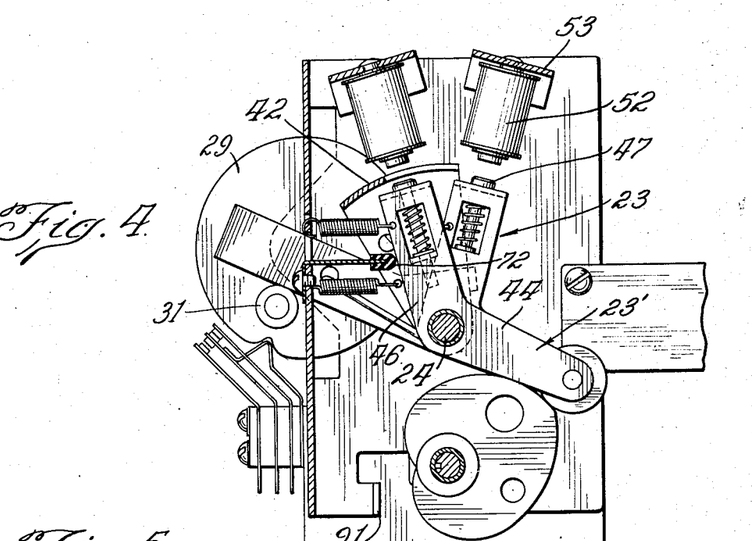
Fig. 4 is a cross-sectional view taken along the line 4—4 of Fig. 1 and showing the control elements at this point in starting position.
Figure 6:
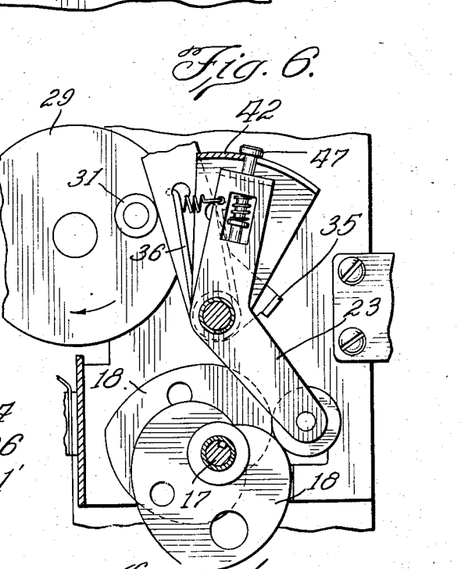
Fig. 6 is a cross-sectional view along the line 6—6 of Fig. 1 showing the driving and control elements in a position assumed when two control buttons are pressed at the same time substantially.
Figure 7:
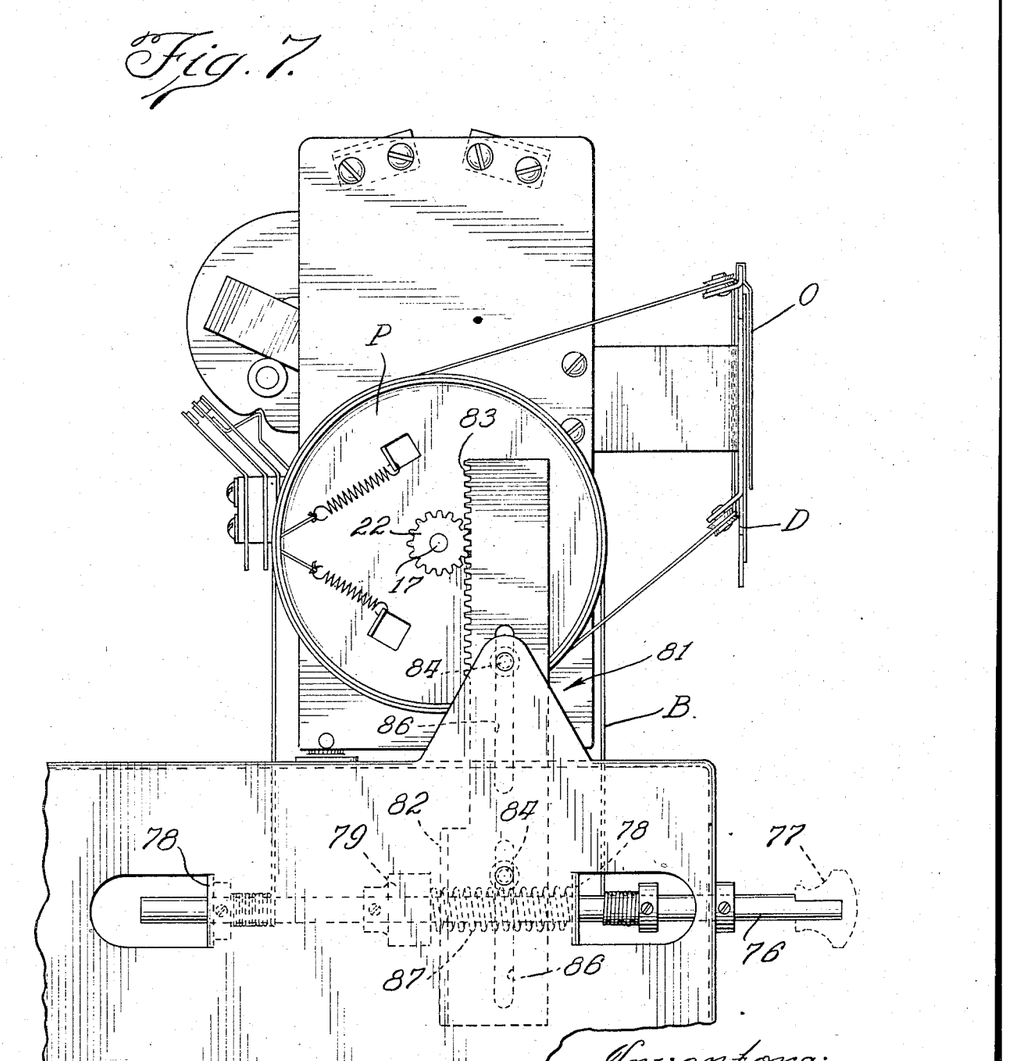
Fig. 7 is an end elevation looking at the left-hand end of the structure illustrated in Fig. 1 and in the direction of the arrows along the line 7—7 of such figure.

The latch member 33 is illustrated in detail in Fig. 7, and comprises a substantially U-shaped member having a pair of supporting legs 38 and a crosspiece 39 including alternate projecting portions 41, and cavities 42. In order to conserve as much space as possible axially of the tuner unit, alternate selector levers are staggered in their upper portions so as to provide for a similar staggered relation for the locking electromagnets as shown in Fig. 4. One group of selector levers, as illustrated in Figs. 2 and 3, and designated by the reference character 23, includes an upper portion 43 disposed at a relatively small angle with reference to the lower portion 44 of the lever. The selector levers 23' such as shown in Figs. 4 and 5 have the lower portions 44 separated by a greater angle from the upper portions 46 than is the case with the corresponding portions of the levers 23. The lower portion 44 of each type of selector lever is substantially identical. The latch member 33 is connected with a preselected selector lever to drive the latter by means of a slidable plunger 47 carried in integral ears 48 stamped out of each lever. The plunger has an enlarged head which hooks over the edge of the latch member when the former is drawn upwardly to temporarily lock the latch member and lever together as shown in Figs. 3, 5, and 6. A spring 49 carried on each plunger, rests intermediate the top ear 48 and a washer 51 secured to the plunger to be compressed when the plunger is drawn upwardly and then act to retract the plunger when the tuning operation is completed.

Each plunger 47 may be selectively drawn upwardly in a lever upon energization of a corresponding electromagnet 52. The electromagnets are insulatingly supported from brackets 53 secured in the tuner frame, and correspond in number to the selector levers 23 and 23'. Each electromagnet 52 is electrically connected into a circuit including a push button or the like 54 (Fig. 15), which may be carried on a remote control unit, or mounted on the front of the radio receiver cabinet. Each electromagnet and its corresponding push button are connected in series, and each such set is connected in parallel with the other sets as is clear from Fig. 15. The complete operating circuit extends from a source of current C, through the various sets of electromagnets and push buttons through a multi-leaf switch S, and a motor M, back to source C. Upon operation of a selected push button 54 the circuit is closed from the source C, and the corresponding electromagnet 52 is energized to attract the plunger 47 of the corresponding selector lever 23 or 23' to the face of the core in the magnet. The circuits extends from a push button through conductor 56 and switch contacts 57, which are normally in closed position, to the motor M which is illustrated diagrammatically in Fig. 15 centrally of the enlarged commutator disc 29. Simultaneously with the energization of the motor M, the commutator disc 29 is rotated thereby. The commutator disc is provided with a cavity or recess 58 in which a switch arm 59 rests when the unit is in idle position with the contacts 57 of the switch S closed.

However, as the commutator disc 29 is rotated, the switch arm 59 moves out of the recess 58 following the contour of the edge of the commutator disc to open the switch at the contacts 57, and close the switch at the contacts 61. The switch arm 59 is insulatingly secured to an intermediate movable switch member 62 carrying a contact 57 on one side and a contact 61 on the other side to engage one or the other of the contacts with its corresponding element depending upon the position of the arm 58 riding on the edge of the disc 29. The operator must push on a button 54 only long enough to permit the disc 29 to rotate to a point where the contacts 57 are opened. With the opening of the contacts 57 and the closing of contacts 61, the electromagnet is cut out of the operating circuit and a resistance 64 cut in corresponding substantially in value to the resistance of the electromagnest so that the motor remains energized and the voltage in the motor circuit remains substantially the same until the commutator disc 29 has passed substantially through 360°. At this time the switch arm 59 re-enters the recess 58 in the commutator disc, the circuit is broken at the contacts 61, and the motor is deenergized. The motor is disconnected from the train of gears 28 when deenergized as a result of the usual declutching operation of an axially movable rotor and interconnecting arms at the end thereof as shown at 27 in Fig. 1.

In the mechanical movement corresponding to the electrical operation described above, the driving arm 32, in engagement with the roller 31 on the disc 29, is pivoted to pivot the latch member 33 in a clockwise direction as viewed in Figs. 2 to 5, inclusive. In the meantime a plunger 47 is attracted to the energized selected electromagnet, and the forward edge of one of the portions of the moving latch member 33 engages the shank of the plunger and its associated selector lever therewith. The shank of each of the plungers 47 is long enough so that it is retained in both of the ears 48 on the selector lever to originally guide the plunger, and subsequently transmit the moving force from the latch member through the plunger to the selected selector lever. The pivotal movement of the selector lever is transmitted to the control member 18 through the roller 24, and such control member frictionally retained on the shaft 17, rotates the latter therewith to in turn move the tuning condenser 12. The tuning condenser 12 is adjusted to a predetermined angular position corresponding to a predetermined broadcast station setting represented by the button 54 originally pushed when the roller 24 is completely seated in the recess 26 in the heart-shaped control member 18. This is shown in Figs. 3 and 5.

In the illustrated embodiments of the invention, six control-member-selector-lever units are shown. It is understood, of course, that this number may be varied. In the embodiment of Figs. 1 to 9, the selected plungers for the selector levers 23 are engaged by the leading edges of the corresponding portion 41 of the latch member 33, while the selected plungers for the selector levers 23', staggered with respect to the first group are engaged by the leading edges of the corresponding portions 42 of the latch member.

As described above, the latch member 33 is driven entirely by virtue of the connection with the driving arm 32 through the torsion spring 26. Except for this connection, the latch member is entirely free to pivot on the shaft 24 as is apparent from the illustration of Fig. 10. The tension in the spring 36 is sufficient when applied through the two end portions of the spring to maintain the latch member 33 against the stop 35 on the driving arm, and such tension is also sufficient to maintain the members in this position during the movement of the latch member to drive a corresponding control unit including a control member and selector lever. Inasmuch as the selector lever normally is pivoted considerably less than 180°, (in one commercial embodiment of this structure, approximately 40°) depending, of course, upon the period of rotation of the shaft 17 having the condenser thereon, and the shape of the intermediate control member 18, means must be provided to disengage the commutator disc which rotates through 360° from the driving arm moving in accordance with a selector lever. Furthermore, it is necessary to insure that the selector lever 23 or 23' be pivoted and the control member 18 be moved therewith a distance such that the roller 24 accurately seats in the recess 26 of the control member. These problems are solved with the torsion spring and cooperating connection between the driving arm and latch member. The commutator disc 29 is positioned with reference to a selector lever so that the roller 24 is seated in the recess 26 at a time, in the complete cycle of operation, before the driving arm 32 stands precisely at an angle of 90° with a radial line through the center of the stub shaft 30, and the center of the roller 31 on the commutator disc. Inasmuch as the selector lever and consequently the latch member 33 locked therewith are stopped at the seated position for the roller 24, the driving arm would normally act to stop the rotation of the commutator disc 29. However, the torsion spring 36 will yield sufficiently upon the continued rotation of the commutator disc 29 to permit the roller 31 to slide along the engaged edge of the driving arm 32 and complete its cycle of rotation. This additional movement of the driving arm 32 causes the stop 35 to pivot clockwise away from the adjacent edge of the latch member 33 a distance corresponding to the radial distance the driving arm must be moved to permit the roller 31 to clear such arm, as shown in Figs. 3 and 5. In the position of the mechanism in each of these figures, the engaged edge of the driving arm 32 is at right angles to a radial line through the centers of the commutator disc and roller thereon. After the roller 31 has passed the peak position, as just described, the force of the various springs including the torsion spring 36, the retracting spring 67 on the latch member 33, and the retracted spring 68 on the selected selector lever, pulls the operating mechanism in a counter-clockwise direction, with the driving arm 32 following the roller 31, until the mechanism is in idle position as shown in Figs. 2 and 4. A stop member 69 having alternate projections 71 and recessed portions 72, with rubber bumpers on the leading edge of each, is mounted on the tuner frame in a position to stop the latch member and selector levers in a predetermined retracted position. The staggered configuration of the member 69 corresponds with that of the latch member 33 as previously described. In the idle or retracted position, the engaged leading edge of the latch member is spaced from the stop position of the selected selector lever so that the plunger 47 thereon is dropped to idle position under the pressure of its spring 49.

Figure 15:
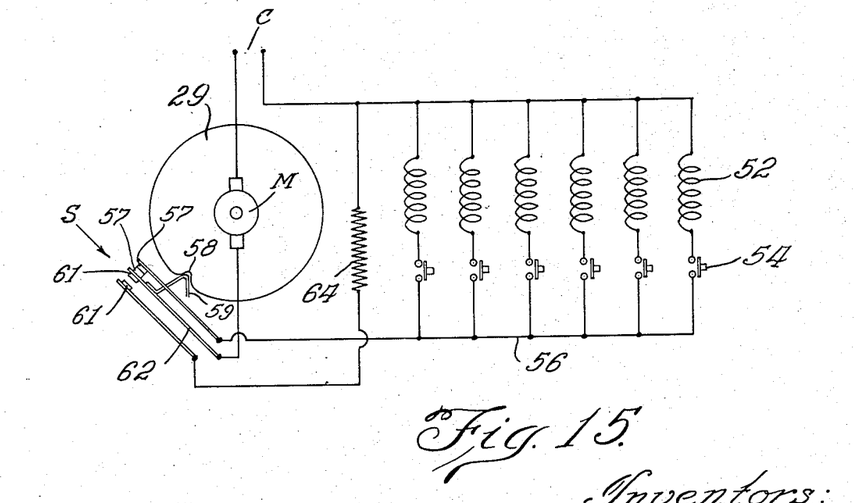
Fig. 15 is a schematic illustration of the circuit and associated elements for both embodiments of the invention.

As can be understood from a consideration of Figs. 2, 4, and 15, the contacts 57 on the switch S are engaged only momentarily, that is, only so long as it requires the switch arm 59 to move out of the recess 58 in the commutator disc. As soon as the circuit through the contacts 57 is broken, the parallel push-button-electromagnet circuits are opened and cannot be closed until the circuit is again established through the contacts 57. This makes it impossible to energize a second electromagnet to attract a corresponding plunger 57, while a previously energized operating circuit is in operation, and as a result, there can be no jamming in the operating mechanism. In the event that two or more push-buttons 54 are manually operated simultaneously to energize the corresponding electromagnets 52 and hence attract the corresponding plungers 47, the selector levers carrying such plungers will be connected with the single latch member 33. However, with two or more rollers 24 on the selector levers in engagement with the corresponding control members 18, a position will be reached very shortly in the cycle of operation wherein the selector levers are stopped against further pivotal movement. This situation is illustrated in Fig. 6 with reference to two selector levers 23, one of the two levers being directly behind the other so that only a single lever is shown in the drawings. The intermediate staggered selector levers 23' are eliminated from this drawing so as not to confuse the illustration of the elements principally considered. As can be seen, however, the control members 18 are at a position of 90° with respect to one another, and act in the same manner as a recess 26 to cause the stopping of the selector levers. Damage to the operating mechanism is prevented, however, by virtue of the torsion spring 36 which permits the driving arm 32 to be pushed in a clockwise direction to enable the commutator disc 29 to complete its rotation and open the motor energizing circuit through the contacts 61.

In the position of the control members in Fig. 6, the stop 35 on the driving arm has been pushed a considerable distance beyond engagement with the edge of the latch member 33.

The shaft 17, and consequently the tuning condenser 12, can be rotated manually to any angular position by means of control apparatus including the horizontally extending shaft 76 having a tuning knob 77 on the end thereof, and journalled in a pair of ears 78 stamped out of the end wall of the chassis 10 as shown in Figs. 7 and 12. The shaft 76 extends at right angles to the shaft 17 and mechanical connection between the two is accomplished by means of a belt or cord B extending around the pulley P on the shaft 17 and wound at its ends around the shaft 76. This same mechanism is used to vary the frictional pressure on the control members 18 to permit the angular adjustment of each of the control members with reference to the shaft 17 to set said control members at a predetermined angular position corresponding to the condenser setting for a desired broadcast or transmitting station tuning setting. Shaft 76 is longitudinally movable as well as rotatable, and is provided with a pinion gear 79 fixedly secured to the shaft in a position such that upon pulling the shaft outwardly the gear is brought into mesh with teeth on a rack portion in a vertically slidable adjusting member 81. Such rack portion on the member 81 is designated by the reference character 82 and stands at right angles to the body of such member. A second rack portion 83 lies in the plane of the body of the member 81 for engagement with the threaded friction gear 22 threadably secured on the shaft 17. The member 81 is mounted upon guide pins 84 supported on the chassis 10 and positioned in vertical slots 82 and moves up and down freely upon rotation of the shaft 17 and gear 22 thereon.

To reduce the frictional pressure exerted on the control members 18 by the washers 19, in order to adjust the angular position of such control members, the shaft 76 is pulled outwardly against the pressure of the spring 87 carried thereon to pull the gear 79 into engagement with the teeth on the rack portion 82 of the slidable member 81. Assuming that a right-hand thread is provided in the gear 22 on the shaft 17, the knob 77 is rotated to rotate the gear 22 and shaft 17 in a counter-clockwise direction until the fixed arm 92 on the shaft 17 engages the rearward stop 91' stamped out of the end plate 14 of the tuner frame. This limits the rotation of the shaft 17 to this position and upon further rotation of the knob 77, the threaded gear 22 is threadably moved to the left as viewed in Fig. 1 to permit the washer and sleeve assembly on the shaft 17 to open up and reduce the friction intermediate the washers 19 and control members 18. In this connection it is understood that the pulley P is axially slidable upon the shaft 17 in the same manner as the washer 19, and sleeve 21, as well as the control members 18, as is apparent from a consideration of Fig. 11. The pulley, however, is keyed against rotation on the shaft. Permitting the shaft 76 to be retracted under the force of the spring 87, the driving connection with the gear 22 is eliminated, and the shaft 17 may be turned by the pulley P and the belt B thereon as for normal manual tuning. The condenser is then rotated to an angular position corresponding to a desired tuning setting by the knob 77 and associated mechanism, and then, holding the condenser in this position by holding the knob 77, a push-button 54 is pressed to close an electrical operating circuit therethrough. The motor M rotates, and the latch member 33 is locked with a selector lever corresponding to the energized electromagnet 52 in the same manner as described above. With the shaft 17 held against rotation, but the control member corresponding to the energized electromagnet free to rotate on the shaft 17 by virtue of the reduction of the frictional pressure thereon, the selected selector lever moves such control member 18 until the roller 24 is seated in the recess 26 for the control member. This same operation may be followed with respect to all six control members 18 to thereby provide settings for such control members corresponding to a like number of tuning positions for the condenser 12.

The shaft 76 may again be pulled outwardly for operating engagement with the member 81, and rotating the shaft in the opposite direction in this instance, the arm 92 is rotated until it is stopped against a projection 91 spaced from the projection 91' approximately 180°, and then on continued rotation of the shaft 76 the threaded gear 22 is rotated and moved axially to the right to move the entire axially slidable assembly therewith. A coupling member or stop as 90 fixedly secured on the shaft 17 at the right end of the assembly, as viewed in Fig. 1, acts to limit the axial movement of the assembly in that direction so that continued adjustment of the threaded gear 22 will increase the frictional pressure of the washers 19 in the slidable assembly against the control members 18 therebetween.

Manual adjustment of the tuning condenser for tuning over the entire broadcast range, and adjustment thereof for setting of the control members 18 may be followed by watching the pointer O connected with the pulley P and moved over the dial D on the front of the receiver in the usual manner.

Figure 13:
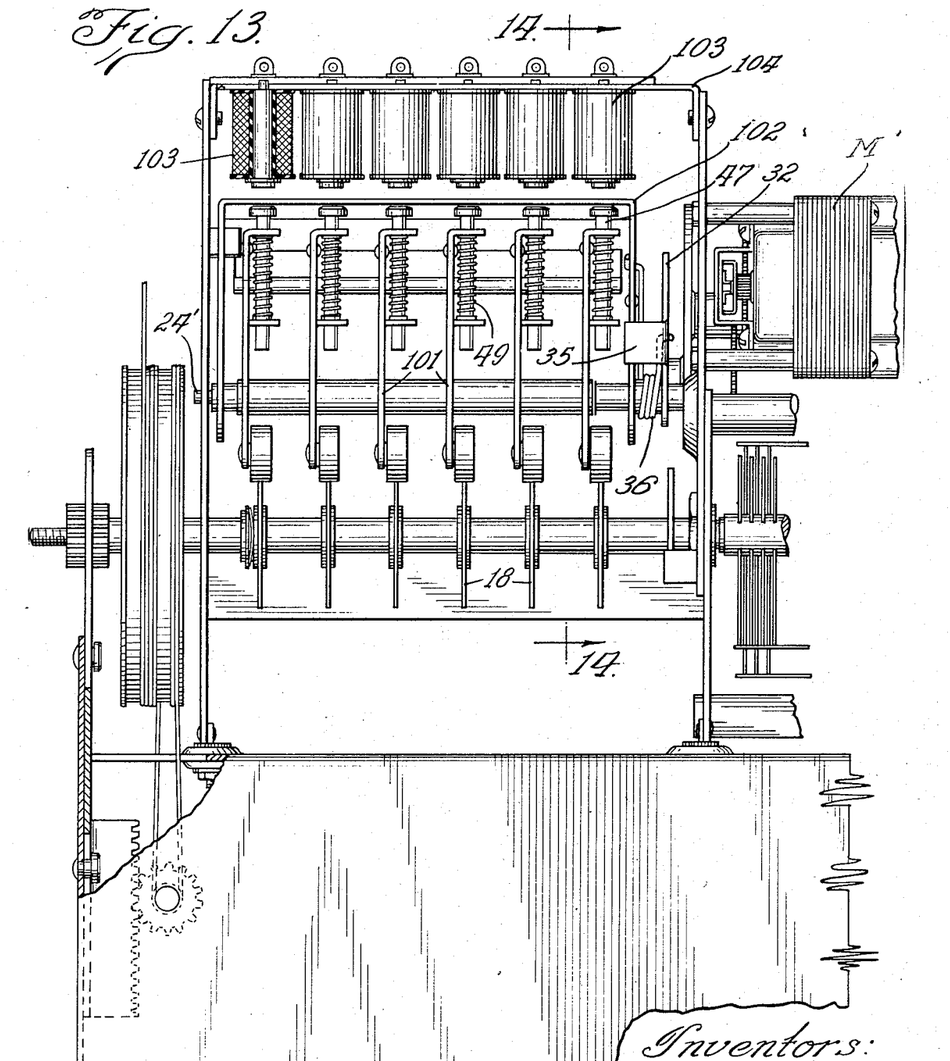
Fig. 13 is a front elevation of another embodiment of our invention.
Figure 14:
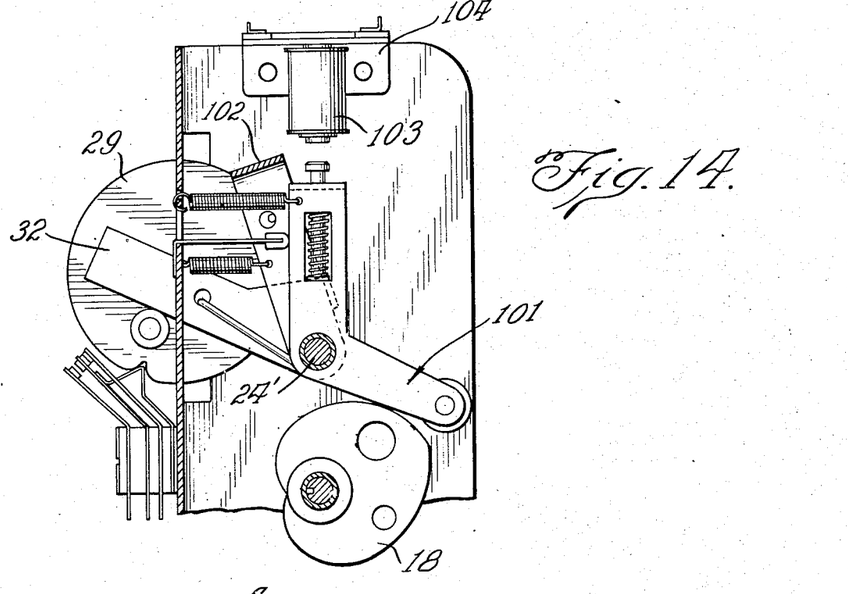
Fig. 14 is a fragmentary cross-sectional view along the line 14—14 of Fig. 12.

A modification of our invention is illustrated in Figs. 13 and 14 of the drawings. The modifications from the preferred embodiment, however, pertain only to the apparatus itself and the circuit of Fig. 15 is used in the modification as well as in the preferred embodiment. The modification merely extends the control apparatus assembly axially, and provides identical selector levers 101 supported on a shaft 24' in the same manner as the preceding structure. The latch member 102 is provided in a straight U-shaped bar pivotally supported on the shaft 24' as contrasted to the latch member 33 having a staggered leading edge thereon to correspond to the staggered positioning of the selector levers 23 and 23'. Similarly, the electromagnets 103 are all mounted in a straight line on a bracket 104 carried on the tuner frame to attract the plungers 47 carried on the selector levers 101 in the same manner as previously described. The entire operation of the commutator disc 29 and the associated driving elements including the driving arm 32 is identical with the structure of the preferred embodiment, and a further description thereof is believed not to be necessary.

In practicing our invention, therefore, we provide a simplified foolproof electrically operated control apparatus for a radio receiver requiring principally inexpensive stamped out parts. The control apparatus is actuated by a unidirectional motor which is normally less expensive than a reversible motor and as a result of rotating always in a single direction, the adjustment of the tuning apparatus is effected in the most expeditious manner.

Although we have illustrated and described our invention in its preferred embodiments, it is understood that modifications therein may be made all within the spirit and scope of the invention, and the invention, therefore, is not limited by the above description and drawings, but is limited only by the scope of the appended claims.

We claim:

1. Control apparatus for a radio receiver including a movable control unit, rotary operating means therefor rotating continuously while energized, through cycles of 360° each, means limiting the movement of said control unit to an angular distance less than 360°, coupling means operatively connecting said control unit and said rotary operating means including spring means within said coupling means transmitting the entire operating force from said operating means to said control unit, with said spring means being yieldable in a rotary direction upon the stoppage of the control unit at one of its limiting positions to permit the continued rotation of said rotary operating means through said cycles while the control unit remains stopped at said limiting position.

2. Electric control apparatus including control means rotatable through less than 360°, axis means for said control means and driving means rotatable entirely through 360° operatively connected with said control means, with said operative connection including a pair of pivoted members pivoting through less than 360° connected together in a manner to normally move in unison and pivoting in planes substantially at right angles to said axis means, but with said connection yieldable to permit one of the two pivoted members to move while the other member remains stationary in a complete cycle of operation of the control apparatus and for permitting continued rotation of the driving means through 360° without injury to the apparatus.

3. Control apparatus for a radio receiver including a control unit and operating means therefor, with said control unit including a rotatable control member connected with tuning means for the radio receiver, a pivoted selector lever for each control member, and means for driving said selector lever, means including a movable armature and a magnet for connecting said lever and said driving means and spring means connected with said driving means and operatively connected with said operating means for connecting said control unit and said operating means to transmit an actuating force from the latter to the former.

4. Control apparatus for a radio receiver including in combination a control unit and operating means therefor, said operating means comprising a motor, a rotary driving member connected therewith rotating through 360° upon energization of the motor to operate the apparatus, a pivoted driving arm in continuous engagement with said driving member pivoting always through less than 360°, and spring means intermediate said driving arm and said control unit and operatively connected to each for transmitting an operating driving force from said arm to said control unit.

5. Electrically operated control apparatus comprising control means including a plurality of selector members, a pivoted driving member common to all of said selector members to selectively move said selector members through a restricted angular path, a rotary driving member rotatable entirely through 360° in mechanical connection with said pivoted driving member, a motor actuating said rotary driving member, an electric control circuit for said apparatus including said motor therein, and a control switch in said circuit mechanically connected with said rotary driving member for operation upon movement of said rotary driving member.

6. In control apparatus for a radio receiver, control means for adjusting the angular position of a tuning unit for a radio receiver, means for driving said control means to selected predetermined positions, said driving means comprising a pivoted latch member, a driving arm independent of said control means operatively connected with said latch member, with said operative connection including a spring member having one end connected with said latch member and the other end connected with said driving arm, with said driving arm adapted for pivotal movement through less than 360°, and means rotatable entirely through 360° in engagement with said driving arm for moving the same.

7. Electrically operated tuning apparatus for a radio receiver including a plurality of cams, a shaft in mechanical connection with a tuning device for said radio receiver for carrying said cams, a pivoted selector lever corresponding to each cam for mechanical engagement with said cam to move the same to a predetermined position, electro-magnetic means adjacent said selector levers, driving means common to all of said selector levers and means for connecting a preselected selector lever with said driving means upon energization of said electro-magnetic means, and operating means for said driving means to move the latter to in turn move the preselected lever and a corresponding cam therewith to adjust the tuning device for the radio receiver.

8. Electrically operated tuning apparatus for a radio receiver including a plurality of control members, a shaft in mechanical connection with a tuning device for said radio receiver for carrying said control members, a movable selector member corresponding to each control member and adapted for mechanical engagement therewith to move said control member to thereby move said tuning device, electro-magnetic means adjacent said selector members, means for driving said selector members, and means for individually connecting a preselected selector member with said driving means, said connecting means including said electro-magnetic means and a spring-pressed connecting member movable on each selector member adapted to be attracted to said electro-magnetic means upon energization of the same to extend into the path of said driving means to be engaged thereby upon actuation of said driving means, means for actuating said driving means, and an electric control circuit for said apparatus including said actuating means for said electro-magnetic means therein.

9. An electric control unit for controllable apparatus including a plurality of control members, a shaft for carrying said control members, a plurality of corresponding selector members for said control members pivotally supported adjacent thereto for engagement therewith, with said selector members provided in such a configuration that the portion of each selector member adjacent a corresponding control member is substantially identical in configuration, and the remaining portion of each selector member is of such a configuration that alternate selector members are positioned to one side and then to the other side of a plane extending radially from the pivotal point for said selector members to provide a staggered positioning for said portions over the entire plurality of selector members, electro-magnetic means supported adjacent one end of the selector members but spaced therefrom having a portion for attracting a metallic element thereto, a pivoted connecting member intermediate the selector members and said electro-magnetic means having a staggered configuration corresponding to the staggered relationship of selector members, means including said electro-magnetic means for selectively connecting a selector member with said connecting member, and means for driving said connecting member to drive said selector members and control members therewith.

10. An electrical control unit for controllable apparatus including a plurality of control members, a shaft for carrying said control members, a plurality of corresponding selector members for said control members pivotally supported adjacent thereto for engagement therewith, with each of said selector members being substantially identical in configuration and supported in axial alignment, electro-magnetic means supported adjacent one end of the selector members but spaced therefrom having a portion for attracting a metallic element thereto, a pivoted substantially U-shaped connecting member having a connecting portion extending in a straight line intermediate the selector members and said electro-magnetic means, means including said electro-magnetic means for selectively connecting a selector member with said connecting member, and means for driving said connecting member to drive said selector members and control members therewith.

11. In an electric control system for controllable apparatus, an energizing source, an electric motor, a control switch for said system, a plurality of control units, and means including electro-magnetic means for connecting said moving means with said control units, a plurality of control circuits including contact means and said electro-magnetic means in series therewith, with each of such control circuits in parallel connection with one another, but in series connection with the energizing source, the motor, and said operating switch, said system also including resistance means in parallel connection with said control circuits and in series connection with said energizing source, said motor, and said operating switch, rotary means driven by said motor for operating said switch to cut a selected control circuit out of electrical connection with said motor and substantially simultaneously therewith cut said resistance into series connection with said energizing source, said motor, and said switch to continue the operation of said motor, with said rotary operating means operatively connected with said means for moving said control units to move a preselected control unit to a predetermined position, and contact means for selective closing to originally energize said motor and electro-magnetic means.

12. Electrically operated tuning apparatus for a radio receiver including a plurality of control members, a shaft connected with a tuning device for said radio receiver for carrying said control member, a pivoted selector member corresponding to each control member for moving the same to a predetermined control position, electro-magnetic means adjacent said selector members, driving means intermediate said electro-magnetic means and said selector members and means for connecting said selector members with said driving means upon energization of the electro-magnetic means, an electric driving motor, a control switch, a circuit including said electro-magnetic means, said motor and said control switch, rotary means operated by said motor to mechanically actuate said switch, with said switch in a position initially in an operating cycle for said apparatus to connect said electro-magnetic means into said circuit but movable by said rotary means to subsequently in the operating cycle cut out the electro-magnetic means from said circuit but maintain said circuit through said motor so as to energize said motor during the remainder of the complete operating cycle for said apparatus.

13. In radio control apparatus having a rotary shaft, frequency changing means operatively connected with said shaft, and power means for driving said shaft, the combination of a switch electrically connected to said power means, a driving member rotatable through 360° operatively connected with said power means and in physical engagement with said switch to operate the same, a pivoted arm pivotable through less than 360° in physical engagement with said driving member and being driven thereby, and connecting means operatively connected with said arm and with said rotary shaft to move the shaft in a control operation.

14. In radio control apparatus having rotary control means including a plurality of control units and a supporting shaft therefor with said units being adjustable relative to said shaft, the combination of a rotary driving motor for all of said control units, and coupling means for operatively connecting said rotary driving motor and a selected control unit including rotary driven means operatively connected to said motor and rotatably driven thereby, a plurality of solenoids corresponding to said control units, a pivoted member corresponding to each control unit having an armature portion thereon attracted to a selected solenoid upon energization thereof, and movable means within said coupling means operatively connected with said armature portion and operatively connected with said rotary driven means to transmit the driving power of the rotary motor to move the selected control unit to a predetermined position.

15. In radio control apparatus having rotary control means including a plurality of control units and a supporting shaft therefor with said units being adjustable relative to said shaft, the combination of a rotary driving motor for all of said control units, and coupling means for operatively connecting said rotary driving motor and a selected control unit including a rotary driven member operatively connected to said motor and rotatably driven thereby, a plurality of solenoids corresponding to said control units, a selector member corresponding to each control unit, an armature slidably supported on each selector member and attracted to a selected solenoid upon energization thereof, a pivoted gate common to all selector members releasably latched to the attracted armature, and means operatively connecting said gate and rotary driven means to transmit the driving power of the rotary motor to move the selected control unit to a predetermined position.

ALEXANDER W. PLENSLER.
RICHARD C. MARHOLZ.